(12) United States Patent
Liu et al.

(10) Patent No.: US 9,461,888 B2
(45) Date of Patent: Oct. 4, 2016

(54) POLICY PROCESSING METHOD AND NETWORK DEVICE

(71) Applicant: Huawei Technologies Co., Ltd., Shenzhen (CN)

(72) Inventors: Hewei Liu, Hangzhou (CN); Yunlong Shi, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 14/088,665

(22) Filed: Nov. 25, 2013

(65) Prior Publication Data
US 2014/0156823 A1 Jun. 5, 2014

Related U.S. Application Data

(63) Continuation of application No. PCT/CN2012/085721, filed on Dec. 3, 2012.

(51) Int. Cl.
*G06F 15/177* (2006.01)
*H04L 12/24* (2006.01)
*H04L 29/06* (2006.01)

(52) U.S. Cl.
CPC ....... *H04L 41/0893* (2013.01); *H04L 63/0263* (2013.01)

(58) Field of Classification Search
CPC .................. H04L 41/0893; H04L 63/0263
USPC ........................................ 709/220, 221, 223
See application file for complete search history.

(56) References Cited

U.S. PATENT DOCUMENTS 7,058,821 B1 6/2006 Parekh et al.
7,072,958 B2 7/2006 Parmar et al.
(Continued)

FOREIGN PATENT DOCUMENTS

CN 1829160 A 9/2006
CN 1938703 A 3/2007
(Continued)

OTHER PUBLICATIONS

Eick, C., et al., "Integration of Rules into a Knowledge Base Management System," Proceedings of the First International Conference on Systems Integration, Apr. 23-26, 1990, pp. 86-95.
Basile, C., et al., "Network-Level Access Control Policy Analysis and Transformation," IEEE/ACM Transactions on Networking, vol. 20, No. 4, Aug. 2012, pp. 985-998.
(Continued)

*Primary Examiner* — Wing F Chan
*Assistant Examiner* — Joseph Maniwang
(74) *Attorney, Agent, or Firm* — Conley Rose, P.C.; Grant Rodolph

(57) ABSTRACT

A policy processing method and network device. The method includes: performing a mixed orchestration on all service rules corresponding to multiple services, so as to construct multiple condition sets; performing, according to the constructed multiple condition sets, unified condition matching on packet feature information of a received network packet, and outputting a condition matching result set; and calling, a service application to execute a policy action corresponding to each condition identifier in the condition matching result set. In solutions of the embodiments of the present invention, by performing a mixed orchestration on multiple service rules, all service rules are organized in a unified manner, information required by all services is extracted in one packet scanning process, and only one matching and rule verification process is required. Thereby, redundant operations between multiple services are reduced, and device integration and performance are improved.

15 Claims, 9 Drawing Sheets

(56) References Cited

U.S. PATENT DOCUMENTS

| | | | |
|---|---|---|---|
| 7,257,833 B1 * | 8/2007 | Parekh | H04L 63/0227 726/1 |
| 8,065,721 B1 * | 11/2011 | Shah | H04L 63/0209 726/13 |
| 2005/0222996 A1 | 10/2005 | Yalamanchi | |
| 2006/0172862 A1 | 8/2006 | Badarneh et al. | |
| 2008/0215518 A1 | 9/2008 | Matsuda | |

FOREIGN PATENT DOCUMENTS

| | | |
|---|---|---|
| CN | 101055630 A | 10/2007 |
| CN | 101141295 A | 3/2008 |
| CN | 101192967 A | 6/2008 |
| CN | 101739248 A | 6/2010 |
| CN | 102130965 A | 7/2011 |
| CN | 101876994 B | 2/2012 |
| KR | 20060022257 A | 3/2006 |
| WO | 2006090781 A1 | 8/2006 |

OTHER PUBLICATIONS

Foreign Communication From a Counterpart Application, European Application No. 12876592.2, Extended European Search Report dated Feb. 23, 2015, 7 pages.

Foreign Communication From a Counterpart Application, Korean Application No. 10-2013-7031987, Korean Office Action dated Sep. 23, 2014, 3 pages.

Foreign Communication From a Counterpart Application, Korean Application No. 10-2013-7031987, English Translation of Korean Office Action dated Sep. 23, 2014, 1 page.

Partial English Translation and Abstract of Chinese Patent Application No. CN101055630, Mar. 23, 2016, 18 pages.

Partial English Translation and Abstract of Chinese Patent Application No. CN101739248, Mar. 23, 2016, 18 pages.

Foreign Communication From a Counterpart Application, Chinese Application No. 201280003466.6, Chinese Office Action dated Jan. 12, 2016, 5 pages.

Foreign Communication From a Counterpart Application, Chinese Application No. 201280003466.6, Chinese Search Report dated Dec. 24, 2015, 2 pages.

* cited by examiner

POLICY PROCESSING METHOD AND NETWORK DEVICE

CROSS-REFERENCE TO RELATED APPLICATIONS

This application is a continuation of International Application No. PCT/CN2012/085721, filed on Dec. 3, 2012, which is hereby incorporated by reference in its entirety.

TECHNICAL FIELD

The present invention relates to the field of communications technologies, and in particular, to a policy processing method and a network device.

BACKGROUND

In a communications system, policy control is an indispensable function of various core network-devices (such as a router, a switch, and a gateway). As shown in FIG. 1, a user configures multiple policy rules by using a configuration interface or a specific policy script or by other means, and delivers the policy rules to a device, and the device processes multiple services on the device based on the policy rules.

On the current network devices, and in particular, there are more and more service applications on devices such as a router, a switch, and a gateway, for example, application delivery control (ADC), wide area network (WAN) optimization control (WOC), deep packet inspection (DPI), intrusion prevention system (IPS), and uniform resource locator filter (URLF) service applications. The number and types of policy rules corresponding to various service applications are also increasing continuously. With the increase of the complexity of service rules, a policy processing method is faced with challenges in device performance and reliability.

As shown in FIG. 2, the execution of a policy rule in the prior art includes the following steps: packet processing (policy-related information collection), condition matching, rule verification, and action execution. After a device receives packet data, the device first performs layer 1 to layer 7 data processing on the received packet data, which generally includes disassembling a packet, extracting packet header information of various layers, and extracting layer 7 protocol field information; then the device verifies the collected information according to policy conditions, and if any condition is satisfied, a rule verifying module is triggered to perform rule matching; and if a policy rule is matched, a corresponding service action is executed. If different services require different packet processing, special processing of a part of packets may be included.

In the prior art, when duplicate information exists in packet information required by various services, duplicate service processing procedures exist. For example, the IPS, URLF, and ADC all require that condition matching should be performed on Uniform/Universal Resource Locator (URL) information. In this case, in each service, the condition matching process is duplicated, and the rule verification process is also duplicated. In addition, sometimes duplicate and redundant processes also exist in packet processing. For example, when the IPS requires scanning of data of an entire packet, and the URLF requires scanning of only a URL field, while the ADC requires scanning of only Hyper Text Transfer Protocol (HTTP) packet header data, the packet is generally processed independently in the IPS, URLF, and ADC services in the prior art, which means that the packet is scanned for multiple times. Even if the prior art is used, duplicate operations may exist in the steps of packet processing, condition matching, and rule matching. Because many duplicate operations exist, service performance deteriorates on devices that have complex policies and multiple services.

SUMMARY

Embodiments of the present invention provide a policy processing method and a network device, so as to reduce redundant and duplicate operations in a policy execution process, and improve the policy execution performance of the network device.

In a first aspect, an embodiment of the present invention provides a network device, including: a mixed orchestrator, a condition matcher, and a rule matcher, where: the mixed orchestrator is configured to perform a mixed orchestration on all service rules corresponding to multiple service applications running on the network device, so as to extract conditions of all the service rules, where each service rule includes two parts: a condition and an action, and use the extracted conditions to construct at least one condition set, and generate mapping relationship data for recording a mapping relationship between each service rule and a condition in the condition set; the condition matcher is configured to perform, according to each condition set constructed by the mixed orchestrator, condition matching on packet feature information of a network data packet received by the network device, and output a condition matching result set, where the condition matching result set is used to record a condition that is matched successfully; and the rule matcher is configured to determine, according to the condition matching result set and the mapping relationship data generated by the mixed orchestrator, a service rule that is matched successfully, and trigger a service application corresponding to the successfully matched service rule to execute an action corresponding to the successfully matched service rule.

In a first possible implementation of the first aspect, the mixed orchestrator specifically includes: a rule splitting unit, configured to split each of all the service rules into a condition and an action; a duplicate condition filtering and removing unit, configured to extract the conditions obtained by splitting by the splitting unit, and remove duplicate conditions; a condition classifying unit, configured to classify conditions that are left after the duplicate conditions are removed by the duplicate condition filtering and removing unit, so as to obtain at least one type of condition set; and a mapping unit, configured to generate mapping relationship data for recording a mapping relationship between each service rule and a condition in the condition set.

According to the first possible implementation of the first aspect, in a second possible implementation, the mapping unit is specifically configured to: map each condition in the condition set to all service rules including the condition, so as to establish a mapping relationship between each service rule and a condition in the condition set, and generate mapping relationship data for recording the mapping relationship; or, the mapping unit is specifically configured to: when the rule splitting unit splits each of all the service rules into a condition and an action, record a mapping relationship between each service rule and the condition in the service rule, and after the duplicate conditions are removed by the duplicate condition filtering and removing unit, adjust the recorded mapping relationship, so that each condition in the condition set is mapped to all service rules including the condition, and generate mapping relationship data for recording the adjusted mapping relationship.

According to the first aspect, or the first or second possible implementation of the first aspect, in a third possible implementation, the condition matcher is specifically configured to: match the packet feature information of the network data packet received by the network device with the conditions in each condition set, and record an identifier of a successfully matched condition into the condition matching result set.

According to the third possible implementation of the first aspect, in a fourth possible implementation, the network device further includes: an inspector, configured to perform a packet inspection on the network data packet received by the network device to collect the packet feature information of the network data packet, where the condition matcher is specifically configured to perform, according to each condition set constructed by the mixed orchestrator, condition matching on the packet feature information of the network data packet collected by the inspector, and output the condition matching result set.

According to the first aspect, or the first, second, third, or fourth possible implementation of the first aspect, in a fifth possible implementation, in all the service rules of the network device, at least one service rule is a composite rule, where the composite rule is a service rule including multiple conditions; the mixed orchestrator is further configured to record a logical relationship between the conditions in the composite rule; and the rule matcher is specifically configured to determine, according to the condition matching result set, the mapping relationship data generated by the mixed orchestrator, and the logical relationship between the conditions, a service rule that is matched successfully, and call a service application to which the successfully matched service rule belongs to execute an action corresponding to the successfully matched service rule, or send a rule hit message to a service application corresponding to the successfully matched service rule, so that the service application executes an action corresponding to the successfully matched service rule according to the rule hit message.

In a second aspect, an embodiment of the present invention provides a multi-service policy processing method, including: performing a mixed orchestration on all service rules corresponding to multiple service applications, so as to extract conditions of all the service rules, where each service rule includes two parts: a condition and an action, and using the extracted conditions to construct at least one condition set, and generating mapping relationship data for recording a mapping relationship between each service rule and a condition in the condition set; performing, according to each constructed condition set, condition matching on packet feature information of a received network data packet, and outputting a condition matching result set, where the condition matching result set is used to record a condition that is matched successfully; and determining, according to the condition matching result set and the generated mapping relationship data, a service rule that is matched successfully, and triggering a service application corresponding to the successfully matched service rule to execute an action corresponding to the successfully matched service rule.

In a first possible implementation of the second aspect, the performing a mixed orchestration on all service rules corresponding to multiple service applications includes: splitting each of all the service rules into a condition and an action, and generating mapping relationship data for recording a mapping relationship between each service rule and the condition in the service rule; extracting the conditions obtained by splitting, and removing duplicate conditions; classifying conditions that are left after the duplicate conditions are removed, so as to obtain at least one type of condition set; and adjusting the mapping relationship data, so that each condition in the condition set is mapped to one or multiple service rules including the condition, thereby obtaining mapping relationship data between a condition in the condition set and each service rule.

In a second possible implementation of the second aspect, the performing a mixed orchestration on all service rules corresponding to multiple service applications includes: splitting each of all the service rules into a condition and an action; extracting the conditions obtained by splitting, and removing duplicate conditions; classifying conditions that are left after the duplicate conditions are removed, so as to obtain at least one type of condition set; and mapping each condition in the condition set to all service rules including the condition, so as to obtain mapping relationship data between a condition in the condition set and each service rule.

According to the second aspect, or the first or second possible implementation of the second aspect, in a third possible implementation, in all the service rules, at least one service rule is a composite rule, where the composite rule is a service rule including multiple conditions; after the splitting each of all the service rules into a condition and an action, the method further includes: recording a logical relationship between the conditions in the composite rule; and the determining, according to the condition matching result set and the generated mapping relationship data, a service rule that is matched successfully, specifically includes: determining, according to the condition matching result set, the mapping relationship data between a condition in the condition set and each service rule, and the logical relationship between the conditions, a service rule that is matched successfully, and calling a service application to which the successfully matched service rule belongs to execute a corresponding action.

As known from the above technical solutions, with the policy processing method and network device in the embodiments of the present invention, by performing a mixed orchestration on multi-service application policy rules, information required by all services is extracted in one packet data scanning process, and unified condition matching and rule matching are performed for multiple services. Thereby, redundant operations between multiple services are reduced, convergence of multiple services on a single device is facilitated, and device integration and performance are improved; in addition, the cost of service deployment and device hardware is reduced, and the competitive edge of the network device is improved.

BRIEF DESCRIPTION OF DRAWINGS

To illustrate the technical solutions of the present invention more clearly, the following briefly introduces the accompanying drawings for describing the embodiments and the prior art. The accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention more comprehensible, the following describes the technical solutions of the present invention clearly with reference to the accompanying drawings in the embodiments of the present invention. The described embodiments are only a part of the embodiments of the present invention. Based on the described embodiments of the present invention, other embodiments that can solve the technical problem of the present invention and achieve the technical effect of the present invention may be derived by persons of ordinary skill in the art even without creative efforts by making equivalent changes to some or all technical features, and the embodiments derived from such changes apparently shall fall within the scope disclosed by the present invention.

To make the technical solutions provided by the embodiments of the present invention better understood by persons of ordinary skill in the art, application scenarios of the technical solutions of the embodiments of the present invention are briefly described first; the technical solutions provided by the embodiments of the present invention are applicable to a policy control scenario in which there are multiple service applications, for example, a home network, an access network, a convergence network, a backbone network, an enterprise network, a carrier network, and various private/public clouds. The following uses an enterprise private cloud as a typical application scenario for brief description.

Figure 1:
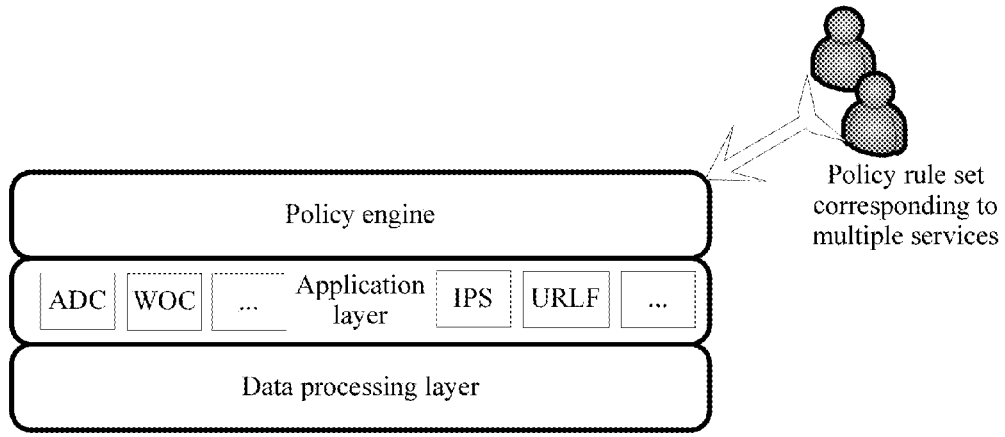
FIG. 1 is a schematic diagram of a layered deployment mode of multi-service policy control according to the prior art.
Figure 2:
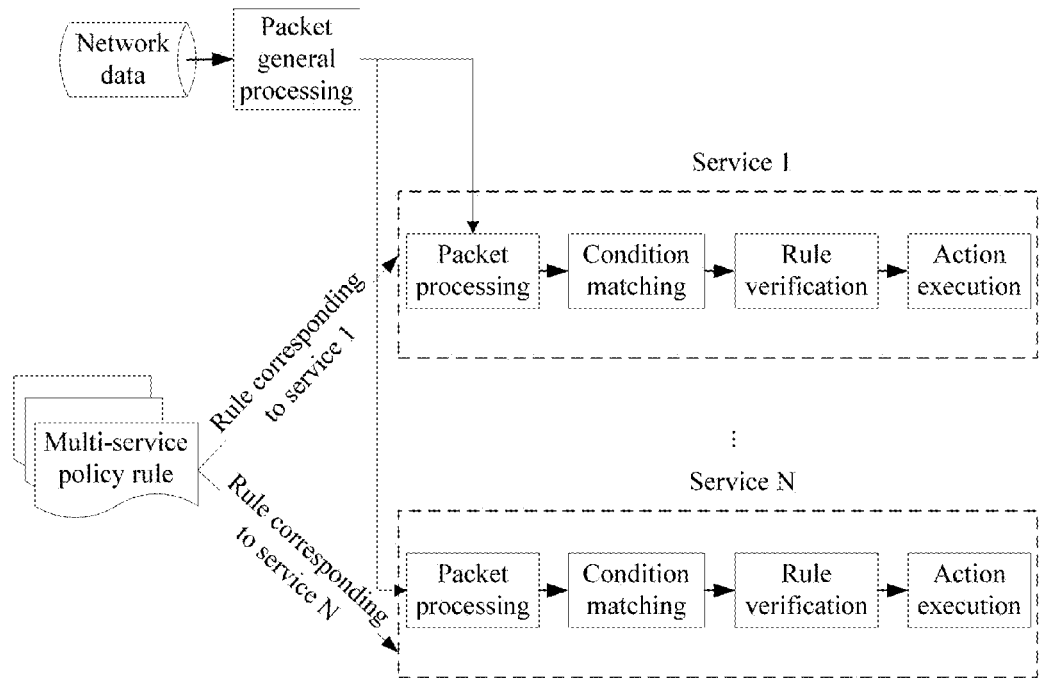
FIG. 2 is a schematic flowchart of policy rule execution according to an embodiment of the prior art.
Figure 3:
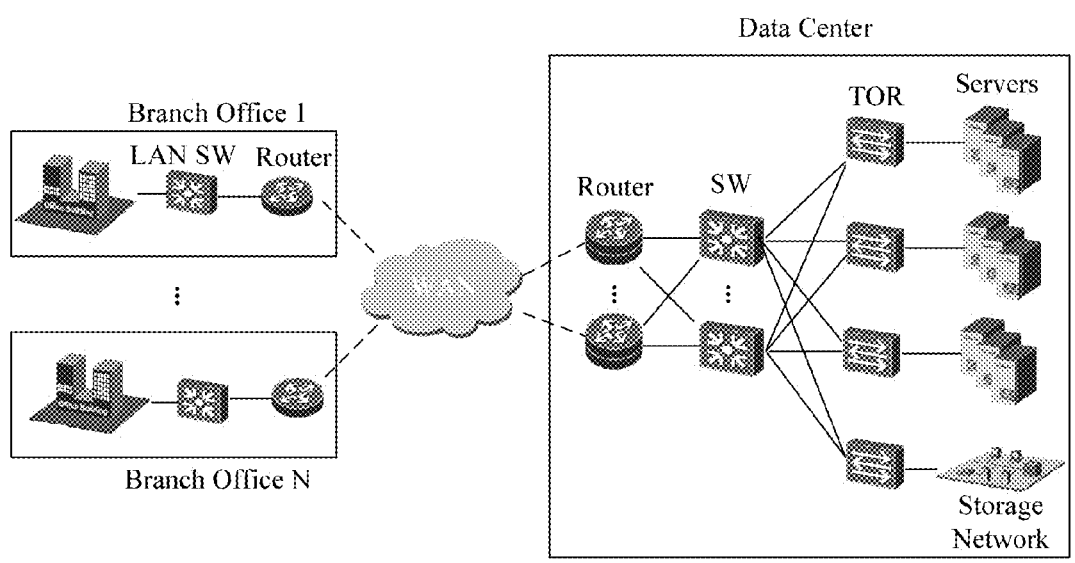
FIG. 3 is a schematic diagram of an enterprise private cloud network according to an embodiment of the present invention.

FIG. 3 is a schematic diagram of a network in an enterprise private cloud scenario according to an embodiment of the present invention. As shown in FIG. 3, in the enterprise private cloud scenario, branch offices form a local area network through a local area network switch (LAN SW) and a router; meanwhile, the local area network formed by the branch offices is interconnected with a data center through a WAN, and multiple routers, gateways, and multiple types of servers (such as a Web server and a database server) are also deployed in the data center; usually, services such as the firewall, WOC, IPS, and URLF are integrated in the routers and switches of the branch offices, and multiple service applications such as the firewall, WOC, ADC, and IPS are integrated in the routers and switches of the data center. In this situation, the routers and switches all require multiple types of policy processing.

It should be noted that the enterprise private cloud scenario is only a typical application scenario of the technical solutions of the present invention, and does not constitute a limitation on the application scenario of the present invention; in other application scenarios, the technical solutions of the embodiments of the present invention are applicable as long as multiple types of policy processing are involved.

Figure 4:
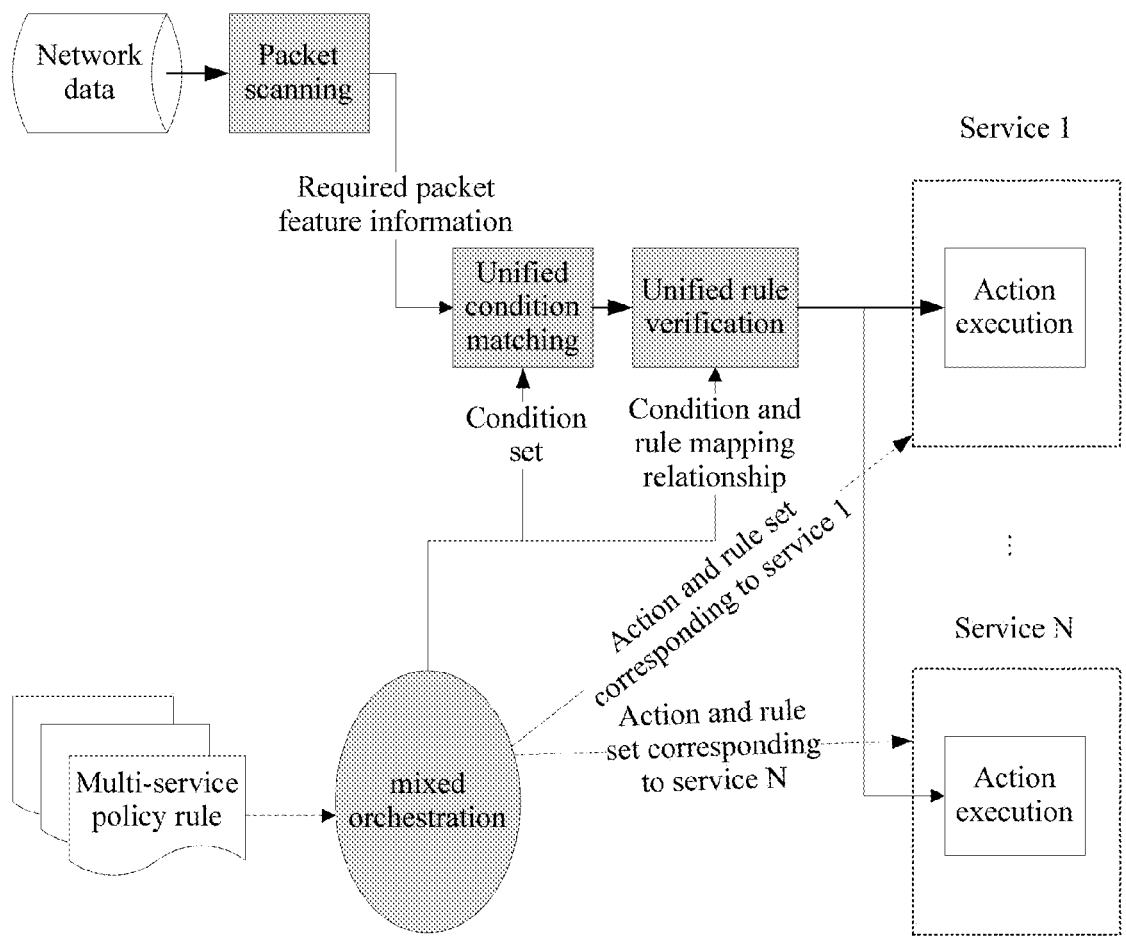
FIG. 4 is a schematic flowchart of a policy processing method according to an embodiment of the present invention.

An overall introduction to the policy processing method provided by an embodiment of the present invention is provided. As shown in FIG. 4, the method mainly includes the processing steps of packet scanning, mixed orchestration, unified condition matching, and unified rule verification.

The packet scanning is mainly extracting all packet feature information, for example, URL, 5-tuple, and protocol type as required by multiple service applications, from a received network data packet by performing a packet inspection, for example, a layer 2 to layer 7 DPI. In addition, in the packet scanning process, no redundant operation is performed, and only packet feature information required by a service application (such as WOC, ADC, and IPS) running on the current network device is extracted.

Mixed orchestration is specifically the mixed orchestration of service rules of all service applications, and mainly includes: (1) with respect to only the difference between related packet information, extracting conditions of the same type, and constructing multiple types of condition sets; (2) generating a mapping relationship between the conditions and the rules.

It should be noted that a service rule in the embodiment of the present invention is an execution policy of a service application, where a rule includes two parts: a condition and an action. Specifically, one rule may include one or more conditions and may also include one or more actions, and multiple conditions in a same service rule may come from packet information of different layers. For example, in a rule "if (IP=1.1.1.1 && HTTP.host=www.huawei.com) then drop packet", "IP=1.1.1.1" and "HTTP.host=www.huawei.com" are two parallel conditions, where the former is a condition of the layer 3 (L3), and the latter is a condition of the L7, and the two are in a logical "AND" relationship; and "drop packet" is an action that needs to be executed by a service application when the conditions are matched.

Unified condition matching is unified condition matching for multiple condition sets after the mixed orchestration.

Unified rule verification is performing unified rule matching on a rule set that has undergone the mixed orchestration, and checking which service rules are matched successfully.

The purposes of unified condition matching and unified verification are to perform unified condition verification and rule matching on multiple types of packet feature information collected by performing packet scanning and multiple condition sets that have undergone the mixed orchestration, instead of matching conditions and actions in the rules one by one. For example, still using the above rule "if (IP=1.1.1.1 && HTTP.host=www.huawei.com) then drop packet" as an example, packet feature information of each layer is collected first by performing packet identification and then the information is input to each corresponding condition data set for condition verification; then a condition verification result is reported to a rule matching module for unified rule matching, so as to obtain a hit rule; and finally a service action corresponding to the hit rule is executed.

Figure 5:
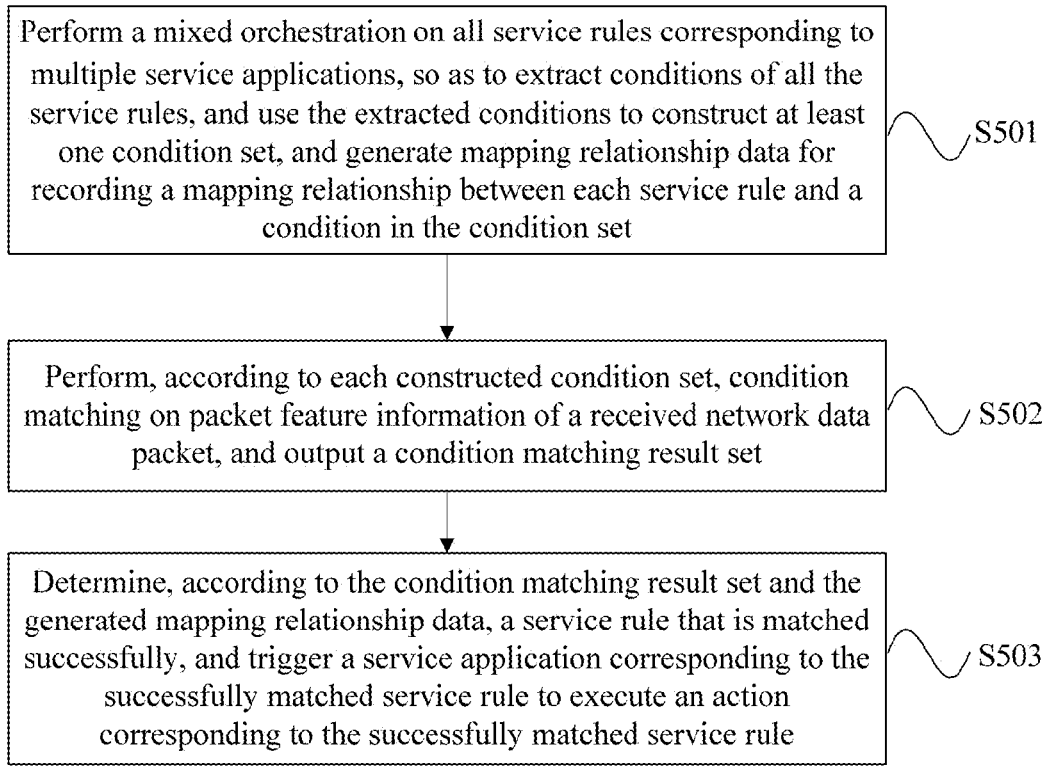
FIG. 5 is a flowchart of a policy processing method according to an embodiment of the present invention.

Based on the above methodology, the following describes a specific embodiment. As shown in FIG. 5, a multi-service policy processing method provided by an embodiment of the present invention includes the following:

S501. Perform a mixed orchestration on all service rules corresponding to multiple service applications, so as to extract conditions of all the service rules, and use the extracted conditions to construct at least one condition set, and generate mapping relationship data for recording a mapping relationship between each service rule and a condition in the condition set.

It should be noted that a service rule usually includes two parts: a condition and an action, which may be described briefly as follows: rule: if (condition set) then (action set), where: the condition set includes conditions and a logical relationship between conditions, usually including AND, and OR; the action set includes multiple serial or parallel service actions corresponding to one rule, and usually may be indicated in sequence, for example, action 1 and action 2; for simplicity, in the embodiment of the present invention, rule 1: if condition 1, then action 1 including only one condition and one action is used for description, where rule 1 indicates that the corresponding action 1 is executed when condition 1 is satisfied.

Specifically, in an embodiment, performing a mixed orchestration on all service rules corresponding to multiple service applications specifically includes the following:

Step 1. Split each service rule into a condition and an action, and generate mapping relationship data for recording a mapping relationship between each service rule and the condition in the service rule.

It should be noted that when all service rules are "a single-condition rule" like rule 1, the mapping relationship between the condition in each service rule and the service rule only needs to be recorded in the mapping relationship data. For such service rules, if the condition is verified successfully, which indicates that the service rule corresponding to the condition is matched, the action included in the service rule may also be triggered and executed. In an embodiment, if a composite rule including multiple conditions exists, it is not enough to only record the mapping relationship between each service rule and the condition in the service rule, because in this case, the condition cannot uniquely correspond to a rule; therefore, it is necessary to record a logical relationship between conditions in a same rule, in addition to recording the mapping relationship between each service rule and the condition in the service rule; in this case, whether the rule is matched successfully can be determined only according to the matching result of each condition included in the same rule and the logical relationship between conditions. Finally it should be noted that mapping relationship data is only a functional name, and may be a carrier for storing data such as a data table and a data file in specific implementation.

Step 2. Extract the conditions of all service rules obtained by splitting, and remove duplicate conditions.

Step 3. Classify conditions that are left after the duplicate conditions are removed, so as to obtain at least one type of condition set.

Specifically, classifying the conditions that are left after the duplicate conditions are removed is classifying the conditions with the same feature into a type, for example, classifying conditions for matching an Internet Protocol (IP) address into a type, and classifying conditions for matching a URL into a type. Certainly, classification may also be performed according to a matching mode, for example, classifying conditions for matching according to a regular expression mode into a type, and classification may also be performed according to packet information layers, for example, classifying L3 conditions into a type, and classifying L7 conditions into a type. In addition, it should be noted that in another implementation, the condition included in the service rule may be not only a feature information related condition of L1 to L7 packet data, and may further include a policy condition such as a service event, a protocol type, and service result, which may be used to determine whether a type of service action is executed.

Step 4. Adjust the mapping relationship data, so that each condition in the condition set is mapped to all service rules including the condition, thereby obtaining mapping relationship data between a condition in the condition set and each service rule.

Because duplicate conditions are removed from all the extracted conditions in step 2, all conditions in each condition set obtained after classification are unique. However, the previously created mapping relationship data is damaged while duplicate conditions are removed. Therefore, the mapping relationship data needs to be adjusted. After the adjustment, all service rules including a same condition are mapped to the corresponding same condition in the condition set, that is, each condition in the condition set is mapped to one or multiple service rules including the condition.

Certainly, it is understandable that in another embodiment, the above steps may be further simplified; the mode in which mapping relationship data is generated first and then the mapping relationship data is adjusted after duplicate conditions are removed is not used, and instead, after conditions of all service rules are extracted and duplicate conditions are removed and a condition set is formed by classification, each condition in each condition set is directly mapped to all service rules including the condition, so that the mapping relationship data between a condition in the condition set and each service rule is obtained.

Further, in another embodiment, after step 4, the following step may be included:

Step 5. Compile each condition set obtained after classification into a unified format.

Specifically, according to the condition classification result after duplicate conditions are removed, the classified condition sets each are compiled, according to the types, into a format supported by a condition matching engine. Further, the mapping relationship data for recording the mapping relationship between the service rule and the condition in the service rule may be compiled into a format required by a rule matching engine; in addition, if the above composite rule exists, it is further necessary to store the logical relationship between conditions in each composite rule into the rule matching engine (or store the logical relationship after compiling it into the format supported by the rule matching engine). It should be noted that the condition matching engine is mainly responsible for unified verification of various conditions, that is, for verifying the condition data in which service rules are matched successfully. Those skilled in the art may understand that the condition matching engine may be implemented by software or by hardware logic, which is not further described herein.

Figure 6:
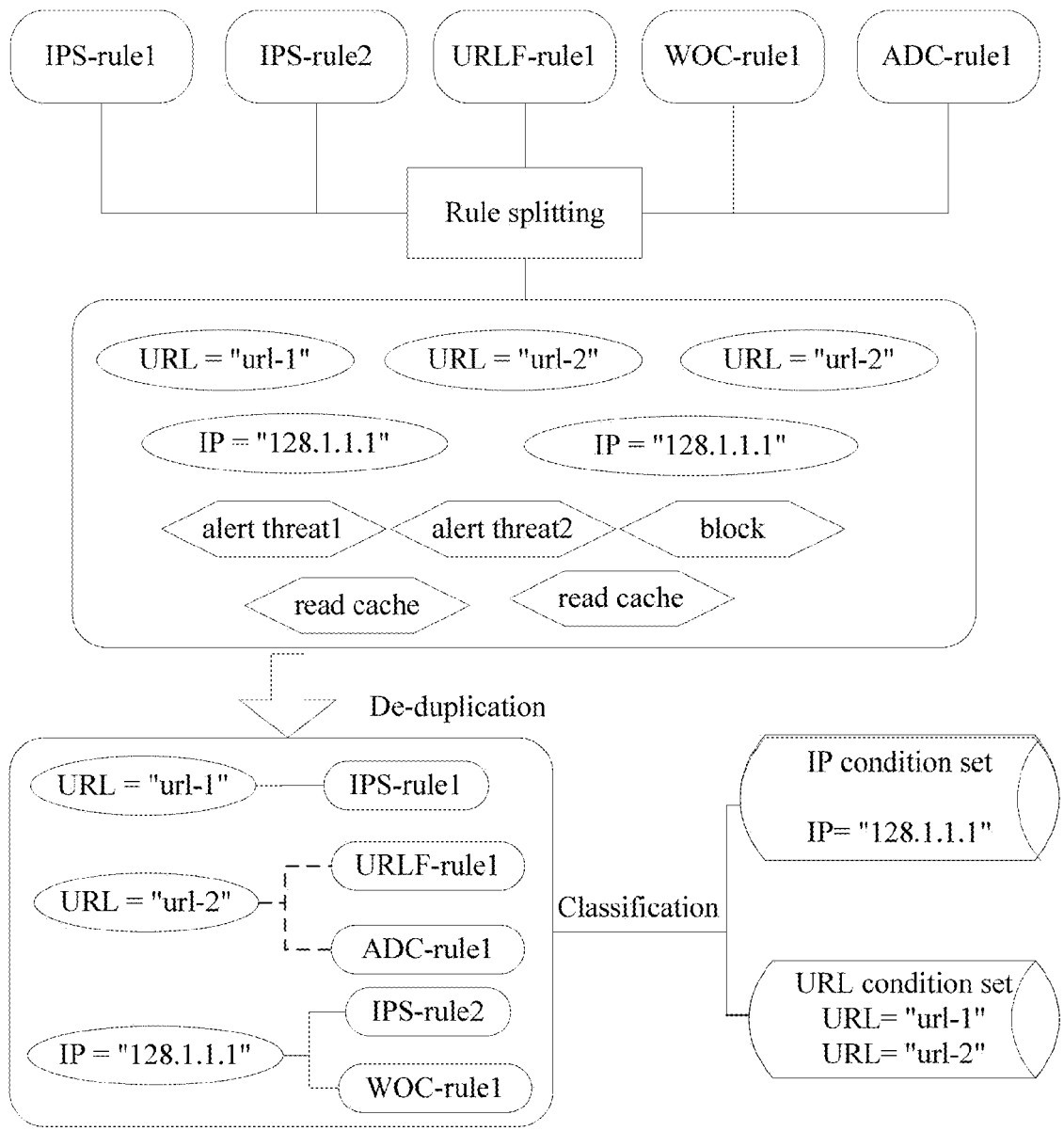
FIG. 6 is a schematic diagram of a method for the mixed orchestration of multi-service rules according to an embodiment of the present invention.

The following describes the above step by using a specific instance. As shown in FIG. 6, the current network device has the following service rules (herein the above "single condition" is used as an example for description):

```
IPS-rule1: if (URL = "url-1") alert threat 1 (alert process 1);
IPS-rule2: if (IP = "128.1.1.1") alert threat 2 (alert process 2);
URLF-rule1: if (URL = "url-2") block;
WOC-rule1: if (IP="128.1.1.1") read cache (read cache);
ADC-rule1: if (URL = "url-2") block;
```

First, each service rule is split, that is, each service rule is split into a condition and an action, and the mapping relationship between the rule and the condition is recorded; in FIG. 6, URL="url-1", URL="url-2", IP="128.1.1.1", and so on are all conditions; alert threat1, block, and alert threat 2 are all actions; then, duplicate conditions are removed from all the conditions obtained by splitting, for example, conditions of IPS-rule2 and WOC-rule1 are duplicate, and conditions of URLF-rule1 and ADC-rule1 are duplicate; after the duplicate conditions are removed, it is further necessary to adjust the mapping relationship between the condition and the rule, for example, the condition IP="128.1.1.1" shown in FIG. 6, after the duplicate conditions are removed, needs to be mapped to the two rules of IPS-rule2 and WOC-rule1, and the condition URL="url-2" needs to be mapped to URLF-rule1 and ADC-rule1; then the conditions that are left after duplicate conditions are removed are classified, as shown in FIG. 6, URL related conditions are classified into one type, and IP related conditions are classified into one type, forming a URL condition set and an IP condition set.

S502. Perform, according to each constructed condition set, condition matching on packet feature information of a received network data packet, and output a condition matching result set, where the condition matching result set is used to record a condition that is matched successfully.

Specifically, the packet feature information of the network data packet specifically includes all packet features related to a service rule of each service application, namely, packet feature information that must be used at the time of verifying whether the condition in each service rule is matched, which may be specifically L1-L7 information of the network data packet, for example, URL information related to the condition of the URLF rule and 5-tuple information related to the condition of the IPS rule. The packet feature information of the network data packet may further include packet feature information related to the condition for determining whether a type of service action is executed, for example, service event, protocol type, service result, and so on.

Assuming that multiple condition sets are formed after conditions of each service rule are classified and compiled and duplicate conditions are removed, for example, a URL condition set, an IP condition set, and an application layer protocol type condition set, unified condition matching is performed on the extracted packet feature information, which specifically includes: inputting the URL of the network data packet into the URL condition set for matching, inputting the IP address of the network data packet into the IP address condition set for matching, and inputting the application layer protocol type of the network data packet into the application layer protocol type condition set for matching, where the specific matching process is comparing whether the feature information of the network data packet matches the conditions in each condition set or satisfies the requirement of the conditions. Matching results of all condition sets are summarized into "a condition matching result set", which is finally reported to a rule matching engine, where the condition matching result set is used to indicate which conditions are matched successfully (hit). Specifically, the successfully matched conditions may be included in the condition matching result set by means of identifiers.

In a specific implementation, step 5502 specifically includes the following:

S5021. Perform a packet inspection on the received network data packet, so as to extract all packet feature information required by the multiple service applications.

All packet feature information, for example, URL, 5-tuple, and protocol type required by multiple services, may be extracted from the received network data packet by performing a packet inspection, for example, a layer 2 to layer 7 DPI. In addition, in a packet scanning process, no redundant operation is performed, and only packet feature information required by a service application (such as WOC, ADC, and IPS) running on the current network device is extracted. It should be noted that the packet feature information required by the service application specifically refers to packet feature information related to the service rule corresponding to the service application, or more specifically, packet feature information corresponding to the condition in the service rule, namely, packet feature information that must be used at the time of verifying whether the condition included in the service rule is satisfied.

S5022. Match the extracted packet feature information with the conditions in each condition set, and record an identifier of a successfully matched condition into the condition matching result set.

S503. Determine, according to the condition matching result set and the generated mapping relationship data, a service rule that is matched successfully, and trigger a service application corresponding to the successfully matched service rule to execute an action corresponding to the successfully matched service rule.

In a specific embodiment, if the service rules are "a single-condition rule" including only one condition, the rule matching engine can determine, according to the mapping relationship between the conditions and the service rules recorded in the mapping relationship data, which service rules are matched successfully, that is, which rules are hit; if a service rule is a composite rule including multiple conditions, the rule matching engine needs to determine, according to the mapping relationship between each service rule and the conditions and the logical relationship between conditions in each service rule, whether the rule is hit; finally, the service application corresponding to the successfully matched service rule is triggered to execute the action corresponding to the service rule. It is understandable that the process of triggering the action execution may be as follows: calling a service application to which the successfully matched service rule belongs to execute an action corresponding to the successfully matched service rule; or sending a rule hit message to a service application corresponding to the successfully matched service rule, so that the service application executes the action corresponding to the successfully matched service rule according to the rule hit message; or reporting a matching result of each service rule to the corresponding service application, so that the service application decides, according to the matching of the service rule of the service, whether to execute the action corresponding to the rule.

As known from the above technical solution, with the policy processing method in the embodiment of the present invention, by performing a mixed orchestration on multi-service rules, all service rules are organized in a unified manner, information required by all services is extracted in one packet data scanning process, and only one condition matching and rule verification process is required. Thereby, redundant operations between multiple services are reduced, convergence of multiple services on a single device is facilitated, and device integration and performance are improved; in addition, the cost of service deployment and device hardware is reduced, and the competitive edge of the network device is improved.

Figure 7:
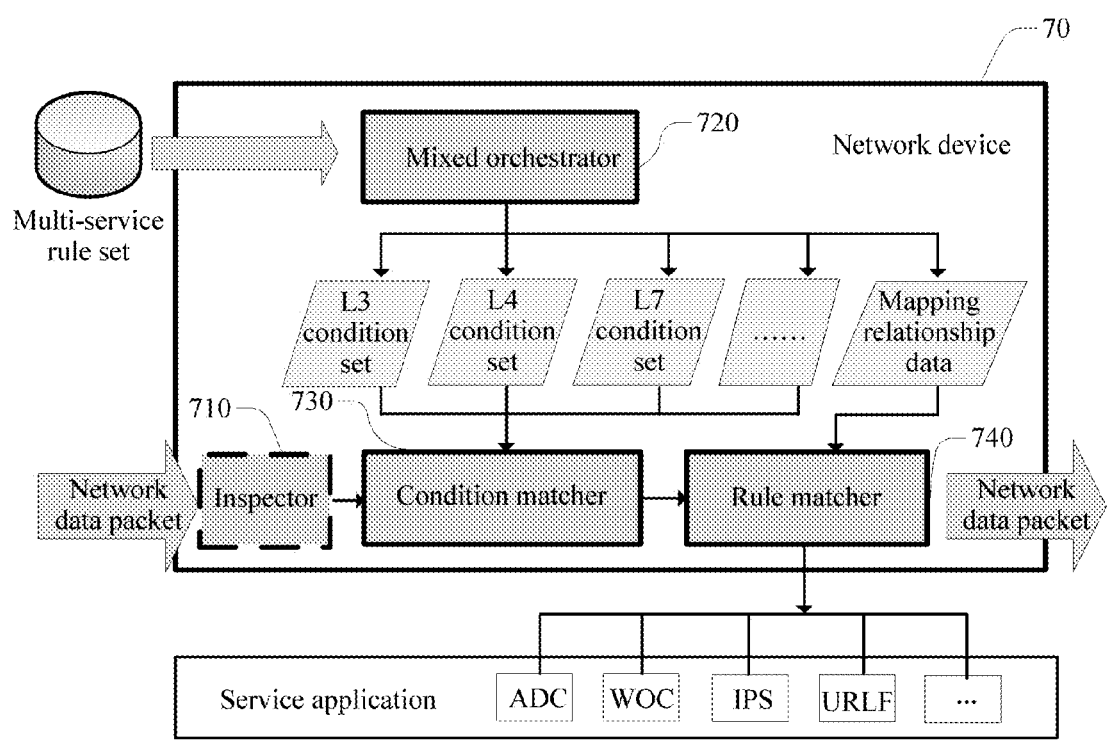
FIG. 7 is a schematic diagram of a network device according to an embodiment of the present invention.

The following describes an apparatus embodiment for implementing the above method. As shown in FIG. 7, an embodiment of the present invention provides a network device. According to FIG. 7, the network device 70 includes: a mixed orchestrator 720, a condition matcher 730, and a rule matcher 740, where each service rule includes two parts: a condition and an action.

The mixed orchestrator 720 is configured to perform a mixed orchestration on all service rules corresponding to multiple service applications running on the network device 70, so as to extract conditions of all the service rules, and use the extracted conditions to construct at least one condition set, and generate mapping relationship data for recording a mapping relationship between each service rule and a condition in the condition set.

The condition matcher 730 is configured to perform, according to each condition set constructed by the mixed orchestrator 720, condition matching on packet feature information of a network data packet received by the network device 70, and output a condition matching result set, where the condition matching result set is used to record a condition that is matched successfully.

The rule matcher 740 is configured to determine, according to the condition matching result set output by the condition matcher 730 and the mapping relationship data generated by the mixed orchestrator 720, a service rule that is matched successfully, and trigger a service application corresponding to the successfully matched service rule to execute an action corresponding to the successfully matched service rule.

Figure 8:
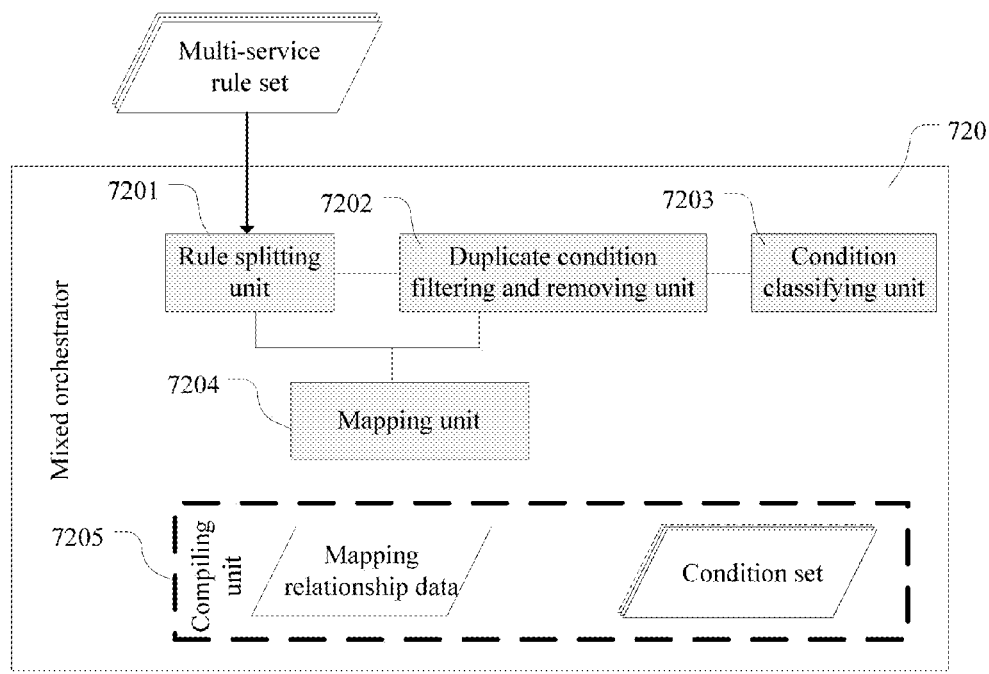
FIG. 8 is a schematic diagram of a mixed orchestrator according to an embodiment of the present invention.

Specifically, in an implementation, as shown in FIG. 8, the mixed orchestrator 720 specifically includes: a rule splitting unit 7201, a duplicate condition filtering and removing unit 7202, a condition classifying unit 7203, and a mapping unit 7204.

The rule splitting unit 7201 is mainly configured to split each service rule in a multi-service rule set into a condition and an action, where the multi-service rule set includes all service rules corresponding to one or multiple service applications running or deployed on the network device 70.

The duplicate condition filtering and removing unit 7202 is configured to extract the conditions obtained by splitting by the rule splitting unit 7201, and remove duplicate conditions.

The condition classifying unit 7203 is configured to classify conditions that are left after the duplicate conditions are removed by the duplicate condition filtering and removing unit 7202, so as to obtain at least one type of condition set.

Specifically, the condition classifying unit 7203 is configured to classify conditions having a same feature into one type, for example, classify conditions for IP address matching into one type, and classify conditions for URL matching into one type. Certainly, classification may also be performed according to a matching mode, for example, classifying conditions for matching according to a regular expression mode into a type, and classification may also be performed according to packet information layers, for example, classifying L3 conditions into a type, and classifying L7 conditions into a type. In addition, it should be noted that in another implementation, the condition included in the service rule may be not only a feature information related condition of L1 to L7 packet data, and may further include a policy condition such as a service event, a protocol type, and a service result, which may be used to determine whether a type of service action is executed.

The mapping unit 7204 is configured to generate mapping relationship data between a condition in the condition set and each service rule.

Specifically, the mapping unit 7204 may directly map each condition in the condition set to all service rules including the condition, so as to obtain mapping relationship data between a condition in the condition set and each service rule. In another embodiment, the mapping unit 7204 may also be configured to: when the rule splitting unit 7201 splits each of all the service rules into a condition and an action, generate mapping relationship data for recording a mapping relationship between each service rule and the condition in the service rule, and after the duplicate conditions are removed by the duplicate condition filtering and removing unit 7202, adjust the mapping relationship data, so that each condition in the condition set is mapped to one or multiple service rules including the condition, thereby obtaining mapping relationship data between the condition in the service rule and each service rule.

Further, in an embodiment, the mixed orchestrator 720 further includes: a compiling unit 7205 configured to compile each of all types of condition sets obtained by classification into a unified format according to the types, where the unified format is a format supported by the condition matcher 730; and correspondingly, the condition matcher 730 is specifically configured to perform, according to the condition sets of the unified format compiled by the compiling unit 7205, condition matching on the packet feature information of the network data packet received by the network device 70, and output the condition matching result set.

Further, the compiling unit 7205 may be configured to compile the mapping relationship data generated by the mapping unit 7204 into a format supported by the rule matcher 740; in addition, if a composite rule like the above rule exists, further store the logical relationship between conditions in each service rule into the rule matcher 740 (or store the mapping relationship data after the data is compiled into the format supported by the rule matcher 740).

In a specific implementation, the condition matcher 730 is specifically configured to match the packet feature information of the network data packet received by the network device 70 with the conditions in each condition set, and record an identifier of a successfully matched condition into the condition matching result set. Herein the feature information of the network data packet used for matching specifically includes all packet feature information related to the service rule of the service application running on the network device 70, that is, packet feature information corresponding to the condition in each service rule; the identifier of the condition is used to uniquely indicate the condition, and may be specifically a number, a letter, or a character string, and so on.

The condition matcher 730 is specifically configured to perform unified condition matching in each type of condition set according to the feature type and packet feature information corresponding to the conditions, and so on. It should be noted that the condition set is not limited to the condition set related to the feature information of L1-L7 packet data, and may further include other condition sets for determining whether a type of service action is executed, for example, a service event, a protocol type, a service result, and so on.

Figure 9:
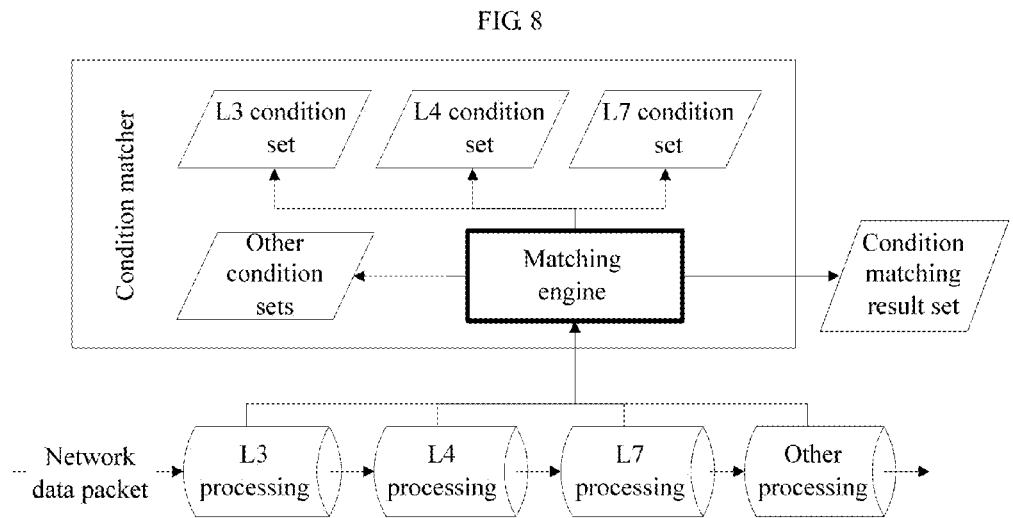
FIG. 9 is a schematic processing flowchart of a condition matcher according to an embodiment of the present invention.

In an implementation, as shown in FIG. 9, the processing procedure of the condition matcher 730 is as follows:

First, the network data packet is processed and parsed by one or multiple processing units (as shown in L3-L7 processing in FIG. 9, and other processing), and all packet feature information required by multiple services is extracted and submitted to the condition matcher 730 for unified matching; then, the condition matcher 730 performs corresponding multi-mode matching on the extracted packet feature information according to each condition set generated by the mixed orchestrator 720. This matching mode is centralized condition matching; the output result of the condition matcher 730 is a condition matching result set, namely, a set of identifiers of successfully matched conditions, where each condition identifier uniquely indicates a condition.

In another embodiment, the network device 70 may further include: an inspector 710, configured to perform a packet inspection on the received network data packet to collect all packet feature information required by multiple service applications running on the network device 70; correspondingly, the condition matcher 730 is specifically configured to perform, according to each condition set constructed by the mixed orchestrator 720, condition matching on the packet feature information of the network data packet collected by the inspector 710, and output the condition matching result set.

It should be noted that in an actual application, the inspector 710 may be multiple packet processing units, where each packet processing unit is independently responsible for a type of packet scanning, for example, a processing unit dedicated to L3 processing, a processing unit dedicated to L7 processing, and so on; all packet processing units jointly extract all packet feature information required by the multiple services; it should be noted that the packet feature information required by the services specifically refers to packet feature information related to all service rules corresponding to the service application on the network device, or more specifically, packet feature information that must be used at the time of verifying whether each condition included in the service rule is matched. In another implementation, the inspector 710 may also be a multi-function processor integrating L3-L7 processing or even other types of packet processing functions, for example, a DPI module. In addition, it is understandable to those skilled in the art that in an actual application, the inspector 710 may be not only deployed in the network device, but also used as an independent service module and deployed outside the network device and interconnected with the network device 70 through a bus or in other communication modes.

In an application scenario, the condition matcher may be an independent matching engine, where the matching engine may be implemented by software algorithm or hardware logic.

Figure 10:
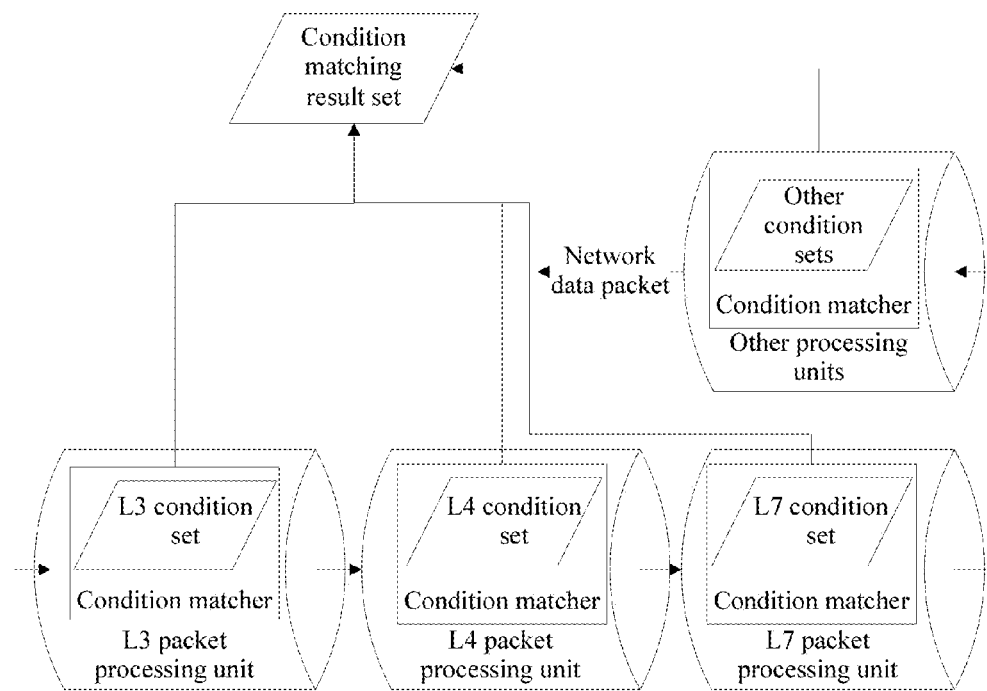
FIG. 10 is a schematic processing flowchart of a condition matcher according to an embodiment of the present invention.

In another application scenario, as shown in FIG. 10, if the inspector 710 includes multiple packet processing units, the condition matcher 730 may also be divided into multiple logical functional units, which are deployed in each packet processing unit in a distributed manner; in this scenario, according to the feature classification, the mixed orchestrator 720 delivers the condition sets obtained after classification to the corresponding packet processing units, and the condition matcher 730 is deployed in each packet processing unit; after the packet processing unit extracts the packet feature information, the extracted packet feature information is directly reported to the condition matcher 730 in the packet processing unit; if a condition is matched successfully, the result is reported to the condition matching result set.

Figure 11:
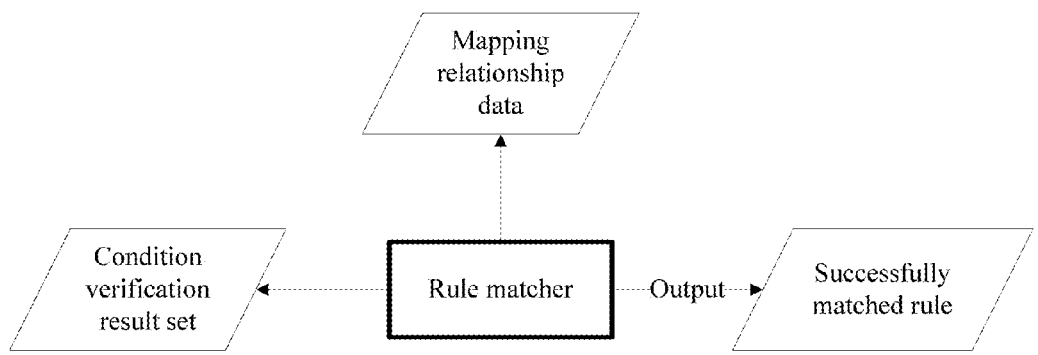
FIG. 11 is a schematic processing flowchart of a rule matcher according to an embodiment of the present invention.

As shown in FIG. 11, the rule matcher 740 is specifically configured to determine, according to the condition matching result set and the mapping relationship between each service rule and the condition in the service rule recorded in the mapping relationship data, a service rule that is matched successfully, and then call a service application to execute an action corresponding to the service rule. It should be noted that if the service rule is "a single-condition rule" including only one condition, the rule matcher 740 can determine, according to the condition matching result set and the mapping relationship between each service rule and the condition in the service rule recorded in the mapping relationship data, which service rules are matched successfully, that is, which rules are hit, and then trigger the service application to execute the actions corresponding to the hit rules; if a composite rule including multiple conditions exists in the service rules, the rule matcher 740 may specifically determine, according to the condition matching result set, the mapping relationship between each service rule and the condition in the service rule recorded in the mapping relationship data, and the logical relationship between conditions in each service rule, whether the rule is hit; finally, the service application corresponding to the successfully matched service rule is triggered to execute the action corresponding to the service rule. Specifically, the rule matcher 740 may directly call, by calling a process/function, the service application to which the successfully matched service rule belongs to execute the action corresponding to the successfully matched service rule; or send a rule hit message to the service application corresponding to the successfully matched service rule, so that the service application executes the action corresponding to the successfully matched service rule according to the rule hit message, where the rule hit message is used to indicate that the service rule is matched successfully.

Figure 12:
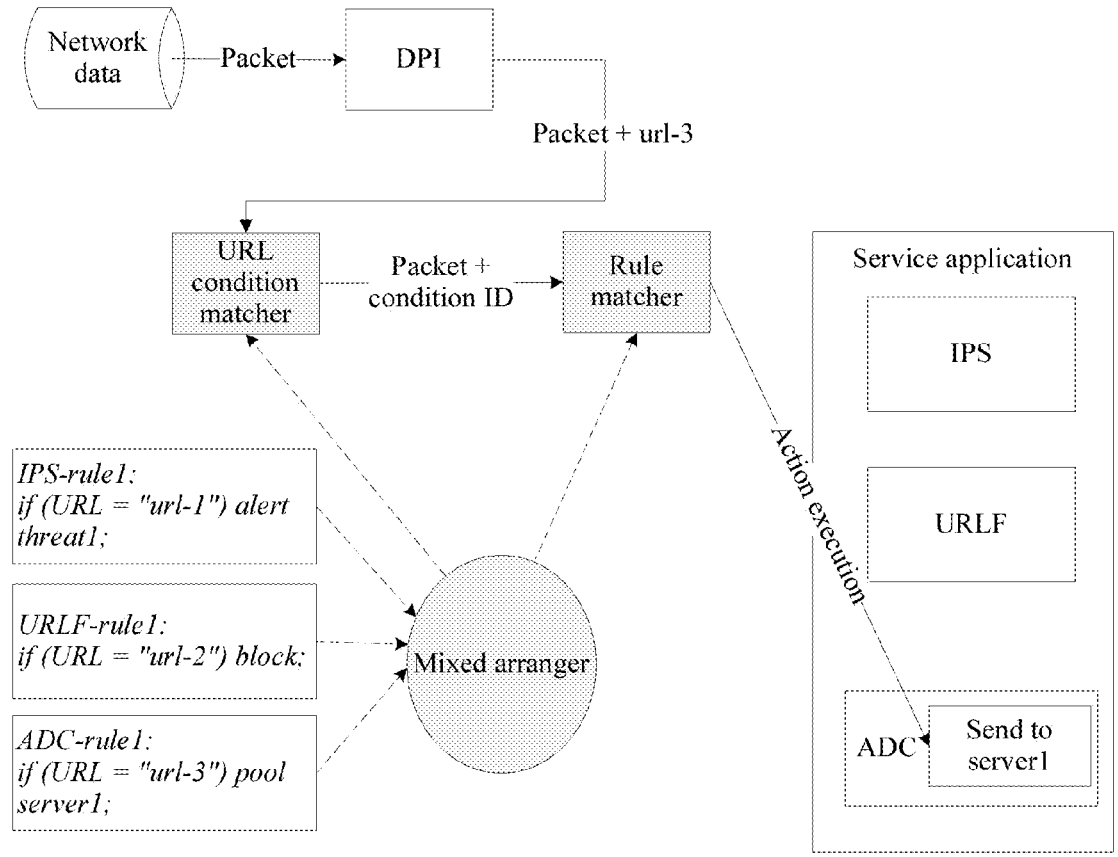
FIG. 12 is a schematic flowchart of a policy processing method according to an embodiment of the present invention.

The following uses a specific instance to describe a policy execution process performed by the network device. FIG. 12 shows a multi-service policy execution method executed with respect to HTTP packet URL information by a network device according to an embodiment of the present invention. According to FIG. 12, first a mixed orchestrator performs a mixed orchestration on all service rules (FIG. 12 shows three service rules), then extracts and delivers all URL matching conditions to a URL condition matcher, and delivers a mapping relationship between the conditions and the policy rules and policy actions to a rule matcher; during policy execution, the URL information obtained after DPI processing is performed for a packet sent to the URL condition matcher for unified condition matching, and the obtained matching result is sent to the rule matcher. Assuming that an ADC rule is hit at this time, an ADC service unit is directly called to execute the corresponding action. Evidently, in the embodiment of the present invention, only one matching process is required for the URL, only one rule verification process is required, and only one calling process is required for the service unit, which removes redundant operations between multiple services.

Finally it should be noted that the foregoing method embodiment may be referenced for the specific working principle and working process of the network device provided by the embodiment of the present invention, which are not further described herein.

With the network device in the embodiment of the present invention, by performing a mixed orchestration on multi-service rules, all service rules are organized in a unified manner, information required by all services is extracted in one packet data scanning process, and only one condition matching and rule verification process is required. Thereby, redundant operations between multiple services are reduced, convergence of multiple services on a single device is facilitated, and device integration and performance are improved; in addition, the cost of service deployment and device hardware is reduced, and the competitive edge of the network device is improved.

Figure 13:
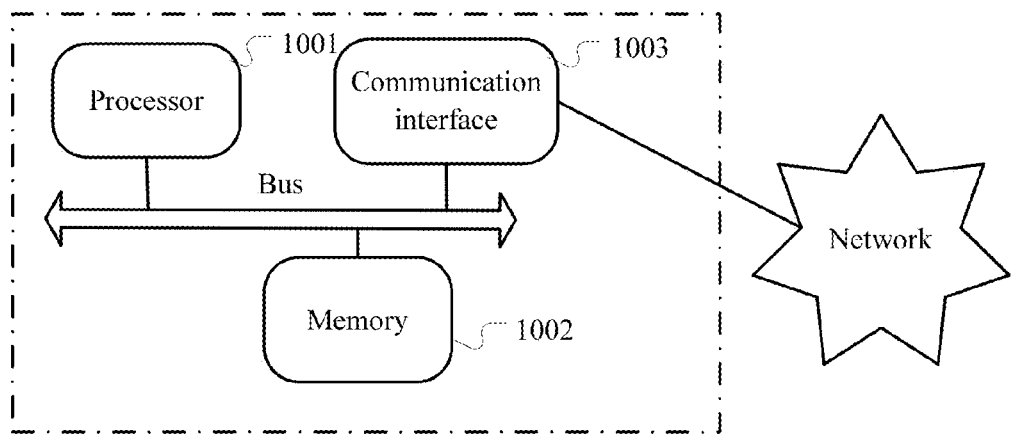
FIG. 13 is a schematic diagram of a network device according to an embodiment of the present invention.

FIG. 13 is a schematic diagram of another network device according to an embodiment of the present invention. As shown in FIG. 13, the network device includes: at least one processor 1001, a memory 1002, a communication interface 1003, and a bus. The processor 1001, the memory 1002, and the communication interface 1003 are connected through a bus and implement mutual communication. The bus may be an industry standard architecture (ISA) bus, a peripheral component interconnect (PCI) bus, or an extended industry standard architecture (EISA) bus, and so on. The bus may be classified into an address bus, a data bus, a control bus, and so on. For ease of indication, the bus is indicated by only a solid line, which does not mean that only one bus or one type of bus exists.

The memory 1002 is configured to store an executable program code, where the program code includes a computer operation instruction. The memory 1002 may include a high-speed random access memory (RAM), and may also include a non-volatile memory, for example, at least one disk storage.

In an embodiment, the processor 1001 reads the executable program code stored in the memory 1002 to run the program corresponding to the executable program code so as to: perform a mixed orchestration on all service rules corresponding to multiple service applications, so as to extract conditions of all the service rules, where each service rule includes two parts: a condition and an action, and use the extracted conditions to construct at least one condition set, and generate mapping relationship data for recording a mapping relationship between each service rule and a condition in the condition set; perform, according to each constructed condition set, condition matching on packet feature information of a received network data packet, and output a condition matching result set, where the condition matching result set is used to record a condition that is matched successfully; and determine, according to the condition matching result set and the generated mapping relationship data, a service rule that is matched successfully, and trigger a service application corresponding to the successfully matched service rule to execute an action corresponding to the successfully matched service rule.

The above procedure is not further described herein. For details, reference may be made to the above method and apparatus embodiments.

The processor 1001 may be a central processing unit (CPU), or an application specific integrated circuit (ASIC), or is configured as one or multiple integrated circuits for implementing the embodiments of the present invention.

It should be noted that the above processor 1001 not only has the above function, but also may be configured to execute other procedures in the method embodiments, which is not further described herein.

The communication interface 1003 is mainly configured to implement communication between the network device in this embodiment and other devices or apparatuses. It is understandable that in the embodiments of the present invention, the disclosed system, apparatus, and method may be implemented in other ways. For example, the apparatus embodiments described above are only exemplary.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units of the network devices in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes any medium that can store program codes, such as a universal serial bus (USB) flash disk, a removable hard disk, a read-only memory (ROM), a RAM, a magnetic disk, or an optical disc.

Finally, it should be noted that the foregoing embodiments are merely intended for describing the technical solutions of the present invention, other than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, without departing from the spirit and scope of the technical solutions of the embodiments of the present invention.

What is claimed is:

1. A multi-service policy processing method, comprising:
performing a mixed orchestration on all service rules corresponding to multiple service applications, wherein conditions of all the service rules are extracted through the mixed orchestration, wherein at least one condition set is constructed based on extracted conditions, wherein mapping relationship data for recording a mapping relationship between the service rules and the extracted conditions is generated, and wherein each service rule comprises a condition and an action;
performing, according to the at least one constructed condition set, condition matching on packet feature information of a received network data packet;
outputting a condition matching result set after finishing the condition matching of all conditions comprised in the at least one constructed condition set, wherein the condition matching result set is used to record a condition that is matched successfully;
determining, according to the condition matching result set and the generated mapping relationship data, a service rule that is matched successfully; and triggering the service application corresponding to the successfully matched service rule to execute an action corresponding to the successfully matched service rule.

2. The multi-service policy processing method according to claim 1, wherein performing the mixed orchestration on all service rules corresponding to multiple service applications comprises:
   splitting each of the service rules into a condition and an action;
   generating mapping relationship data for recording the mapping relationship between each respective service rule and the condition in the respective service rule;
   extracting the conditions obtained by splitting;
   removing duplicate conditions;
   classifying conditions that are left after the duplicate conditions are removed so as to obtain at least one type of condition set; and
   adjusting the mapping relationship data so that each condition in the condition set is mapped to all service rules comprising the condition.

3. The multi-service policy processing method according to claim 1, wherein performing the mixed orchestration on all service rules corresponding to multiple service applications comprises:
   splitting each of all the service rules into a condition and an action;
   extracting the conditions obtained by splitting;
   removing duplicate conditions;
   classifying conditions that are left after the duplicate conditions are removed so as to obtain at least one type of condition set; and
   mapping each respective condition in the condition set to all service rules comprising the respective condition to obtain the mapping relationship data between the conditions in the condition set and the service rules.

4. The multi-service policy processing method according to claim 1, wherein performing, according to the at least one constructed condition set, condition matching on packet feature information of the received network data packet comprises:
   performing a packet inspection on the received network data packet to obtain all packet feature information required by the multiple service applications;
   matching the extracted packet feature information with the conditions in each condition set; and
   recording an identifier of a successfully matched condition into the condition matching result set.

5. The multi-service policy processing method according to claim 1,
   wherein at least one service rule in the service rules is a composite rule, wherein the composite rule is the service rule comprising multiple conditions,
   wherein after the splitting each of the service rules into a condition and an action, the method further comprises recording a logical relationship between the conditions in the composite rule, and
   wherein determining, according to the condition matching result set and the generated mapping relationship data, the service rule that is matched successfully, comprises:
      determining the service rule that is matched successfully according to the condition matching result set, the mapping relationship data, and the logical relationship between the conditions; and
      triggering the service application to which the successfully matched service rule belongs to execute a corresponding action.

6. The multi-service policy processing method according to claim 1, wherein triggering the service application corresponding to the successfully matched service rule to execute an action corresponding to the successfully matched service rule comprises calling the service application to which the successfully matched service rule belongs to execute an action corresponding to the successfully matched service rule.

7. The multi-service policy processing method according to claim 1, wherein triggering the service application corresponding to the successfully matched service rule to execute an action corresponding to the successfully matched service rule comprises sending the rule hit message to the service application corresponding to the successfully matched service rule so that the service application executes an action corresponding to the successfully matched service rule according to the rule hit message.

8. A network device, comprising:
   a processor; and
   a memory, wherein the processor and the memory are connected through a bus, wherein the memory is configured to store an executable program, wherein the processor is configured to run the executable program so as to:
   perform a mixed orchestration on all service rules corresponding to multiple service applications deployed on the network device to extract conditions of all the service rules;
   construct at least one condition set based on the extracted conditions;
   generate mapping relationship data for recording a mapping relationship between the service rules and the extracted conditions, wherein each service rule comprises a condition and an action;
   perform, according to the at least one constructed condition set, condition matching on packet feature information of a received network data packet;
   output a condition matching result set after the condition matching of all conditions comprised in the at least one constructed condition set is finished, wherein the condition matching result set is used to record all conditions that are matched successfully;
   determine, according to the condition matching result set and the generated mapping relationship data, a service rule that is matched successfully; and
   trigger the service application corresponding to the successfully matched service rule to execute an action corresponding to the successfully matched service rule.

9. The network device according to claim 8, wherein the processor is further configured to run the executable program so as to:
   split each of all the service rules into a condition and an action;
   extract the conditions obtained by splitting;
   removing duplicate conditions;
   classify conditions that are left after the duplicate conditions are removed so as to obtain at least one type of condition set; and
   map each responsive condition in the condition set to all service rules comprising the respective condition to obtain the mapping relationship data between the conditions in the condition set and the service rules.

10. The network device according to claim 8, wherein the processor is further configured to run the executable program so as to compile each respective condition set of the at least one condition set obtained by classification into a unified format.

11. The network device according to claim 8, wherein the processor is further configured to run the executable program so as to:
- perform a packet inspection on the received network data packet to obtain all packet feature information required by the multiple service applications;
- match the extracted packet feature information with the conditions in each condition set; and
- record an identifier of a successfully matched condition into the condition matching result set.

12. The network device according to claim 8, wherein at least one service rule in the service rules is a composite rule, wherein the composite rule is the service rule comprising multiple conditions, and wherein the processor is further configured to run the executable program so as to:
- record a logical relationship between the conditions in the composite rule; and
- determine the service rule that is matched successfully according to the condition matching result set, the mapping relationship data, and the logical relationship between the conditions.

13. The network device according to claim 8, wherein the processor is further configured to run the executable program so as to send a rule hit message to the service application corresponding to the successfully matched service rule, so that the service application executes an action corresponding to the successfully matched service rule according to the rule hit message.

14. The network device according to claim 8, wherein the processor comprises multiple packet processing units, and wherein the packet processing units are deployed in a distributed manner.

15. A non-transitory computer readable medium including instructions stored thereon that when processed by at least one processing unit cause a system to perform the acts of:
- performing a mixed orchestration on all service rules corresponding to multiple service applications to extract conditions of all the service rules, construct at least one condition set based on the extracted conditions, and generate mapping relationship data for recording a mapping relationship between the service rules and the extracted conditions, wherein each service rule comprises a condition and an action;
- performing, according to the at least one constructed condition set, condition matching on packet feature information of a received network data packet;
- outputting the condition matching result set after finishing the condition matching of all conditions comprised in the at least one constructed condition set, wherein the condition matching result set is used to record a condition that is matched successfully; determining, according to the condition matching result set and the generated mapping relationship data, a service rule that is matched successfully; and
- triggering a service application corresponding to the successfully matched service rule to execute an action corresponding to the successfully matched service rule.

* * * * *